Patented Nov. 27, 1928.

1,693,441

UNITED STATES PATENT OFFICE.

FRIEDRICH AUGUST HENGLEIN, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY.

PROCESS FOR THE PRODUCTION OF IODATES.

No Drawing. Application filed April 19, 1927, Serial No 185,077, and in Germany June 23, 1926.

The present invention relates to the production of iodates from iodides by the direct oxidation of the latter.

It is known that iodates, such as the alkali metal iodates, decompose when heated giving off oxygen and forming iodides as follows:

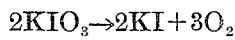

$$2KIO_3 \rightarrow 2KI + 3O_2$$

According to the present invention this reaction is reversed with the formation of iodates from iodides by treating the iodides with oxygen under certain conditions among which are elevated temperatures, superatmospheric pressures and presence of hydroxyl ions acting as catalysts. These three conditions, i. e., heat, pressure and presence of hydroxyl ions, preferably are used together but each may be varied with respect to the other even to the limit of practically dispensing with certain of them.

It has been found, for instance, that at a temperature of about 400° C. oxygen reacts or combines with alkali metal iodides, for instance, potassium iodide, in the presence of an alkali metal hydroxid, for instance, potassium hydroxid, giving the corresponding alkali metal iodate, for instance, potassium iodate. This operation is carried out by contacting oxygen with a melt or fused mixture of potassium iodide and potassium hydroxid preferably in the ratio of 3 molecules of KOH to 1 molecule of KI. A temperature of 400° C. is about the minimum temperature for practical operation, that is, the minimum temperature at which an acceptable reaction rate is obtained. More favorable results are obtained at higher temperatures, for instance, at 500° C. and 600° C. and even higher temperatures and with corresponding superatmospheric pressures, for instance, from 1 atmosphere to more than 100 atmospheres. The process, i. e., contacting oxygen with a melt of potassium hydroxid and potassium iodide, may be carried out satisfactorily at a temperature of 500° C. and at a pressure of 5-15 atmospheres under which conditions a substantially quantitative conversion of iodide to iodate may be obtained. With higher temperatures and pressures the quantity of catalyst required is less. At temperatures above 600° C. and pressures above 100 atmospheres the catalyst may be practically dispensed with it being only necessary to provide for an intimate contact between the iodide and the oxygen.

Similar results may be obtained by employing solutions of the iodide, for instance, by contacting an aqueous solution of potassium iodide with oxygen at temperatures above 100° C. and at pressures of more than one atmosphere. The presence of hydroxyl ions supplied, for instance, by adding potassium hydroxid to the reaction mixture favors the reaction.

It is understood that any suitable hydroxyl ion supplying agent may be employed but for the production of pure iodates it is preferred to use an agent which will not contaminate the product. For instance, in making potassium iodide it is preferred to use potassium hydroxide as the catalyst.

*Example 1.*—5 parts by weight of potassium iodide are dissolved in 100 parts by weight of water and the mixture is heated in a nickel autoclave to 180° C. and exposed during 4 hours to a pressure exerted by oxygen up to ten atmospheres. The potassium iodide is quantitatively converted into potassium iodate.

*Example 2.*—5 parts by weight of potassium iodide and 10 parts by weight of potassium hydroxide are heated in a nickel autoclave to 400° C. under a pressure exerted by oxygen up to 15 atmospheres. After two hours the reaction is complete.

*Example 3.*—5 parts by weight of potassium iodide are treated with oxygen at 600° C. and under a pressure of 20 atmospheres in a nickel autoclave during 2–3 hours. All the iodide is then converted into iodate.

Claims:

1. Process for the production of potassium iodate which comprises contacting oxygen with an aqueous solution of potassium iodide and potassium hydroxid at a temperature above 100° C. and under pressure of more than one atmosphere.

2. Process for the production of iodates which comprises contacting an alkali metal iodide with oxygen in the presence of an alkali metal hydroxid at a temperature above 400° C. and at a pressure above atmospheric pressure.

3. Process for the production of iodates which comprises contacting an alkali metal iodide with oxygen at a temperature above 600° C. and under a pressure above 100 atmospheres.

4. Process for the production of iodates which comprises contacting an alkali metal iodide with oxygen in the presence of an alkali metal hydroxid at a temperature above 100° C. under a pressure above one atmosphere.

5. Process for the production of iodates which comprises contacting oxygen with an alkali metal iodide at a temperature of at least 500° C. and at a pressure of at least 5 atmospheres.

6. Process for the production of iodates which comprises contacting oxygen with potassium iodide in the presence of potassium hydroxid at a temperature of at least 400° C. and under pressure of at least 5 atmospheres.

7. Process for the production of iodates which comprises contacting a melt of about 3 parts of KOH to 1 part of KI with oxygen at a temperature of at least 400° C.

In testimony whereof I have hereunto set my hand.

FRIEDRICH AUGUST HENGLEIN.